Nov. 3, 1925.

A. PURDIE

DETACHABLE LINK

Filed May 4, 1923

1,559,775

Inventor
Alexander Purdie
By
Attorney

Patented Nov. 3, 1925.

1,559,775

UNITED STATES PATENT OFFICE.

ALEXANDER PURDIE, OF WYANDOTTE, MICHIGAN.

DETACHABLE LINK.

Application filed May 4, 1923. Serial No. 636,538.

*To all whom it may concern:*

Be it known that I, ALEXANDER PURDIE, a citizen of the United States of America, residing at Wyandotte, in the county of Wayne and State of Michigan, have invented certain new and useful Improvements in Detachable Links, of which the following is a specification, reference being had therein to the accompanying drawings.

This invention relates to a chain link, coupling or the like, for connecting the ends of a chain or other cable, and its object is to provide a device for the purpose which is very strong and durable and which may be quickly and easily opened for the purpose of disconnecting the ends of the chain connected thereby.

A further object is to reduce the cost and increase the strength of the device by so constructing the same that it may be made of sheet metal stampings, and added strength will be secured through the particular construction and arrangement of the movable or closure member of the link.

A further object is to so construct the device as to preclude the possibility of the accidental opening of the link in use and to insure the ready manipulation of its movable member to disconnect the link from the chain.

It is also an object to provide certain other new and useful features in the construction and arrangement of parts, all as hereinafter more fully described.

With the above and other ends in view, the invention consists in the matters hereinafter set forth and more particularly pointed out in the appended claims, reference being had to the accompanying drawings, in which—

The device embodying the present invention is especially adapted for use as a link in a chain for detachably connecting ends of the chain, but may be used wherever it is desirable to detachably connect two members, each having an open link or eye at its end adapted to be engaged by this connecting link which comprises two parts adapted to be moved relatively to open the link and permit the disengagement of the eyes or chain links therefrom whenever desirable.

Figures 3, 6:
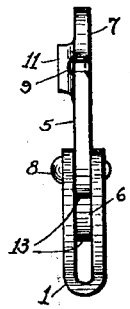
Fig. 3 is an end elevation of Fig. 2.
Fig. 6 is a plan view of a blank from which one of the members of the device is formed.
Figure 4:
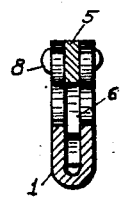
Fig. 4 is a transverse section substantially upon the line IV—IV of Fig. 1.
Figure 5:
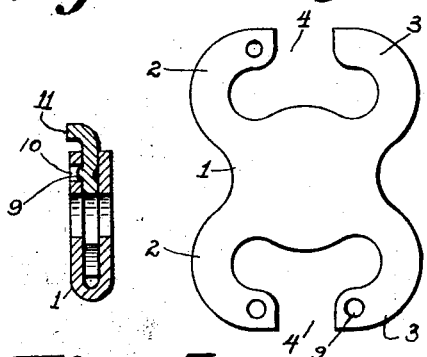
Fig. 5 is a transverse section substantially upon the line V—V of Fig. 1.

As shown in plan view in Fig. 6, the main member 1 of the link is formed from sheet metal which is stamped out to provide a blank with laterally extending arms, there being a pair of like arms 2 at one end, and a similar pair of arms 3 at the opposite end of the blank. These arms extend laterally from the blank and are curved lengthwise of the blank, the pairs of arms at one end curving toward the pair of arms at the other end. In forming the link member, this blank is folded upon itself along the longitudinal center line of the body of the blank, thus bringing the two arms of each pair into parallelism with a space between the adjacent sides of the arms of each pair. A member is thus formed which is in the form of an open link with an entrance opening 4 between the ends of the pairs of arms, and this entrance opening is closed in the finished link, by a pivoted closure or connecting member 5 which is also formed from a sheet metal blank with a curved arm at each end, the arm 6 being curved to conform to the curvature of the pair of arms 2 of the member 1, and the arm 7 being curved to conform to the curvature of the arms 3.

The member 5 is pivoted between the ends of the arms 2 by means of a pivot bolt 8 extending through openings in the ends of the arms 2 and through an opening in the member 5, at such a point, that when the closure member is turned upon its pivot with its straight intermediate portion extending across the opening 4 between the arms of the member 1, the curved end arms 6 and 7 of the member 5 will lie within and fill the spaces between the pairs of arms 2 and 3, coinciding with said pairs of arms.

Figure 1:
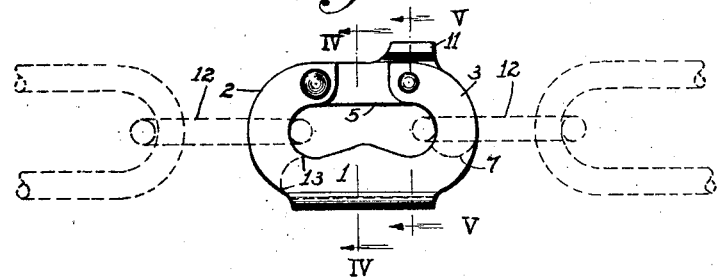
Figure 1 is a side elevation of a device illustrative of the invention and showing the same in closed position.
Figure 2:
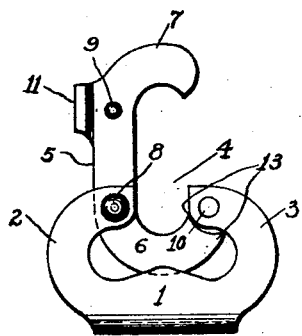
Fig. 2 is a similar view showing the device in open position.

To detachably hold the pivoted member in operative position to close the opening 4, said member is formed with a protuberance 9 adapted to engage a recess 10 in one of the arms 3 when said pivoted member is turned into alignment with said arms, the arms 3 springing apart sufficiently to allow the protuberance to snap into the recess, and to aid in the turning of the pivoted member to open position, a lug 11 is formed upon the upper edge of the member 5, said lug being bent laterally so that a screw driver or other suitable instrument may be inserted between this lug and the upper edge of the adjacent arm 3 to pry against said arm and swing the pivoted member, disengaging its protuberance 9 from the recess in the arm, so that said member may be swung to the position shown in Fig. 2, disengaging the engaged links or eyes of a chain or cable indicated at 12 in dotted lines in Fig. 1, from engagement within the link.

Preferably, the end of the arm 6 of the pivoted member is curved transversely to provide sharp angles or corners 13 at the end of this arm, the purpose of which sharp angles is to cut ice or dirt which may be embedded within the space between the sides of the member 1 and thus assist in clearing this space and permitting the free pivotal movement of the member 5.

By forming the pivoted member 5 with end arms which are curved to conform to the curvature of the pairs of arms 2 and 3, and extending these arms so that when the pivoted member is in closed position, these arms will extend around the ends of the link, the link is greatly strengthened and the strain of the cable engaged within the link and pulling endwise thereon, will come directly upon these curved end arms of the pivoted member as well as upon the pairs of arms of the main member of the link. Further, by reason of the engagement of the cable ends with these curved arms of the pivoted member, the strain of the cable upon the detachable link will securely hold the pivoted member in closed position, thus eliminating any danger of the pivoted member swinging to open position and accidentally opening the connecting link while in use. Cheapness and strength of construction is secured through the forming of the main member from a sheet metal blank and as the pivoted member bridges the space between the ends of the arms of the main member 1, and takes a portion of the strain upon the connecting link, the pairs of arms formed on the blank will be reinforced and strengthened, thus providing a very strong and rigid link which is comparatively light in weight and is cheap to manufacture.

Obviously, the size and proportion of the parts and the particular configuration may be varied as desired without departing from the spirit of the invention, and I do not therefore limit myself except as specifically set forth in the appended claims, to the particular construction shown.

Having thus fully described my invention, what I claim is:—

1. A detachable connecting link comprising a main member having end arms arranged in pairs at each end of said member with the arms of each pair spaced apart laterally of said member and with a space between the ends of the pairs of arms, and a closure member pivoted between the ends of one pair of arms to swing within the space between the arms of each pair and extend across the space between the ends of the pairs of arms, said pivoted member being formed with an arm at each end to lie within and fill the space between the arms of each pair, said arms of the pivoted member extending across the ends of the link within said spaces between the pairs of arms for engaging a member extending through the link at each end thereof and held thereby.

2. A detachable connecting link comprising a main member formed from a sheet metal blank having arms at the ends thereof extending laterally therefrom, said arms being arranged in pairs with the pair of arms at one end of the blank being curved longitudinally of the blank toward the pair at the opposite end thereof, said blank being bent along the center line of the body thereof to bring the arms of each pair into parallel spaced relation with a space between the ends of the pairs of arms, and a closure member pivoted intermediate its ends between the ends of the arms of one pair to extend across and close the space between the pairs of arms, said pivoted closure member being formed with an arm at each end which is curved to conform to the curvature of the arms of each pair and to swing within the spaces between said arms across the ends of the link formed by said pairs of arms and to engage a member extending through each end of the link and engaged by said pairs of arms.

3. A detachable connecting link comprising a main member formed from a sheet metal blank having arms at the ends thereof extending laterally therefrom, said arms being arranged in pairs with the pair of arms at one end of the blank curved longitudinally of the blank toward the pair at the opposite end thereof, said blank being bent along the center line of the body thereof to bring the arms of each pair into parallel spaced relation, and a closure member pivoted intermediate its ends between the ends of the arms of one pair to extend across and close the space between the pairs of arms, said pivoted closure member being formed with an arm at each end which is curved to conform to the curvature of the pairs of arms and lie within the space between the arms of each pair, said arms on the closure member being substantially co-extensive in length with the pairs of arms, the arm on one end of said closure member being formed with sharp cutting end angles, and said closure member being provided adjacent its other arm with a protuberance to engage an opening in an end portion of one of the arms of the adjacent pairs of arms, said pivoted closure member being also provided with a laterally bent lug by means of which said closure member may be swung on its pivot.

In testimony whereof I affix my signature.

ALEXANDER PURDIE.